United States Patent [19]

Meissner et al.

[11] Patent Number: 5,736,076
[45] Date of Patent: Apr. 7, 1998

[54] GRAPHITE MOLDINGS

[75] Inventors: Ruprecht Meissner, Weisenheim; Matthias Irgang, Heidelberg; Knut Eger, Limburgerhof; Peter Weidlich, Mannheim; Heinz Dreyer, Ludwigshafen, all of Germany

[73] Assignee: BASF Aktiengesellschaft, Ludwigshafen, Germany

[21] Appl. No.: 517,841

[22] Filed: Aug. 22, 1995

[30] Foreign Application Priority Data

Aug. 27, 1994 [DE] Germany .................. 44 30 478.1

[51] Int. Cl.⁶ .................................................. B01J 20/02
[52] U.S. Cl. .................. 264/29.6; 502/416; 502/418; 264/29.1; 264/29.7
[58] Field of Search .................. 423/448; 264/29.7, 264/29.1, 29.6, 60, 63; 428/408; 502/416, 418

[56] References Cited

U.S. PATENT DOCUMENTS

| | | | |
|---|---|---|---|
| 4,046,863 | 9/1977 | Kobayashi et al. | 423/448 |
| 4,273,561 | 6/1981 | Villalobos | 51/309 |
| 4,276,072 | 6/1981 | O'Brien, Jr. | 427/167 |
| 5,075,054 | 12/1991 | Handl | 264/56 |
| 5,340,417 | 8/1994 | Weimer et al. | 423/346 |
| 5,554,462 | 9/1996 | Flandois et al. | 423/445 R |

FOREIGN PATENT DOCUMENTS 60317  9/1982  European Pat. Off. .

OTHER PUBLICATIONS

Kirk–Othmer, Encyclopedia of Chemical Technology vol. 4, 4th Edition 1992, pp. 953–974, "Baked and Graphitized Carbon". no date.

Primary Examiner—Michael Lewis
Assistant Examiner—Stuart L. Hendrickson
Attorney, Agent, or Firm—John H. Shurtleff

[57] ABSTRACT

Moldings which comprise from 30 to 100% by weight of graphite, prepared from graphite powders which comprise from 5 to 100% by weight of rhombohedral crystalline graphite and, if required, contain additives and/or binders, and a process for their preparation and their use as catalyst carriers, heat transfer material, column packing or diluent in catalyst beds.

6 Claims, 2 Drawing Sheets

23-0064 D C Graphite (WL: 1.5406Ao) =H 41-1487 I C Graphite-2H (WL: 1.5406Ao) =H
26-1079 C C Carbon graphite-3R (WL: 1.5406Ao) =R

GRAPHITE MOLDINGS

The present invention relates to moldings of graphite, prepared from hexagonal and/or rhombohedral crystalline graphite powders and, if required, additives and/or binders, and a process for their production.

Shaped articles of graphite (Kirk-Othmer, Encyclopedia of Chemical Technology Vol. 4, 4th Edition, 1992, pages 953 to 974) are produced either by extrusion or by compression molding in dies. The raw materials used are various mixtures of filler (preferably petroleum coke, pitch coal, anthracite, natural graphite, synthetic resins), binders (various pitch grades having softening points of from 60° to 180° C. or phenol resins)

and additives (for example fats and waxes as lubricants, iron oxide and boric acid, eg. DE-A-25 35 791).

Compression molding in dies is used in particular for small shaped articles as employed, for example, as electrodes and motor brushes in the electrical industry, for seals and packings in apparatus construction and as inert column packings, as catalyst carriers and as diluent in catalyst beds (EP-A-60 317) in the chemical industry. Very different presses are used for this purpose, for example presses having heated dies, presses which are effective on two sides or presses having flexible molds (isostatic presses).

The further processing of the blanks according to the prior art comprises two heat treatments. First, the binder is coked at from 800° to 1000° C. in a reducing or inert atmosphere. This gives rise to large amounts of volatile decomposition products which contain polycyclic aromatics and therefore necessitate expensive measures for waste gas treatment.

In a further step, graphitization is carried out at from 2600° to 3000° C. In this treatment, the carbon consisting of filler and binder is converted into the desired graphite structure.

The known processes for the production of graphite moldings require expensive pressing methods, high temperatures and in some cases additives which are hazardous to health, and said processes were therefore unsatisfactory.

It is an object of the present invention to remedy the above-mentioned disadvantages.

We have found that this object is achieved by novel moldings which comprise from 30 to 100% by weight of graphite, prepared from graphite powders which comprise from 5 to 100% by weight of rhombohedral crystalline graphite and, if required, contain additives and/or binders, and a process for their preparation and their use as catalyst carriers, heat transfer material, column packings or diluent in catalyst beds.

The novel moldings can be produced as follows:

graphite mixtures which contain rhombohedral crystalline graphite and, if required, additives and/or binders can be compression molded at from 10° to 100° C. and from 5 to 100 kN and preferably subjected to a heat treatment at from 300° to 800° C., preferably from 400° to 600° C., in the absence of oxygen.

Examples of suitable additives are $Al_2O_3$, $ZrO_2$, $SiO_2$, $TiO_2$, SiC, powdered coke and powdered silicates as well as metal powders. This makes it possible to vary important properties, for example density, porosity, electrical conductivity and thermal conductivity, within wide ranges.

Suitable binders are those which are cokable at from 300° to 800° C., for example alginates, cellulose derivatives or other carbohydrates, preferably monosaccharides, such as fructose, glucose, galactose and/or mannose, and particularly preferably oligosaccharides, such as sucrose, maltose and/or lactose.

The coking is carried out in the absence of oxygen.

The novel moldings have high strength and good thermal and electrical conductivity. They are chemically inert and stable to air up to 400° C.

The moldings can be produced, for example, using rotary tablet presses, as also employed in the pharmaceutical industry, or by means of eccentric presses having multiple tools.

It is necessary to use packings having a low pressure loss, a large surface/volume ratio and good separating power, as known from distillation technology. The production according to the invention has now provided a large number of forms of tableted graphite, for example Raschig rings, trilobes, tetralobes, Berl saddles and other shapes which are not completely cylindrical.

Compaction and granulation are preferably carried out prior to tableting. This gives more highly compact particles having a larger diameter and better flow properties for tableting.

The novel moldings comprise from 30 to 100, preferably from 50 to 100, % by weight of graphite and from 70 to 0, preferably from 50 to 0, % by weight of additives. The graphite powder comprises from 5 to 100, preferably from 8 to 100, % by weight of rhombohedral crystalline graphite, and the material used for compression molding comprises from 30 to 100, preferably from 50 to 100, % by weight of graphite, from 70 to 0, preferably from 50 to 0, % by weight of additives and from 0 to 30, preferably from 2 to 20, % by weight of binder.

For example, in the case of tablets having the dimensions 4.75×4.75 mm (diameter×height), it is possible to achieve a lateral compressive strength of more than 100N by means of the novel process. Annular tablets having the dimensions 5×5×2 mm and 7×7×3 mm (external diameter×height× internal diameter) and lateral compressive strengths of from 60 to 80N were also produced by the same method.

The tablets comprising 100% of graphite proved to be dense and not very porous. The porosity determination using a mercury porosimeter gave about 0.1 ml/g.

The novel moldings can be used as sealing and packing material in chemical apparatus construction.

Owing to their good thermal conductivity and chemical resistance, they are also used in chemical process engineering as packing, heat exchanger material or diluent in catalyst beds.

In order to characterize the flow resistance in the reactor, the pressure loss of air is stated in mbar/m height of fill at a gas velocity of 1.0 m/sec, based on the empty reactor cross-section.

For the preparation of catalysts, porous graphite tablets can be impregnated with suitable metal salt solutions and then dried and heated. Furthermore, active components may be added to the graphite powder before tableting and the tableting can then be carried out by the stated method.

If graphite tablets are used as catalyst diluent, they should be uniformly distributed in the entire catalyst bed since this ensures uniform wetting and the avoidance of hot or cold spots in the reactor. This uniformity is generally achieved if the dimensions and density of the catalyst and diluent are about the same so that no separation occurs when reactors are filled.

Finally, tableted graphite moldings which may also contain added metal powder and in some cases are produced with embedded wire feeds are used as carbon brushes in motor construction or as electrodes. These too can be produced by the novel method.

BRIEF DESCRIPTION OF THE DRAWINGS

The following examples are illustrated by the distinctly different X-ray diffraction patterns of FIGS. 1 and 2 for the specific results obtained in Examples 1 and 2, respectively, demonstrating the difference between the prior art use of hexagonal graphite as a comparison with the rhombohedral graphite powder according to the invention.

Examples

Example 1 (Comparative Example)

Figure 1:
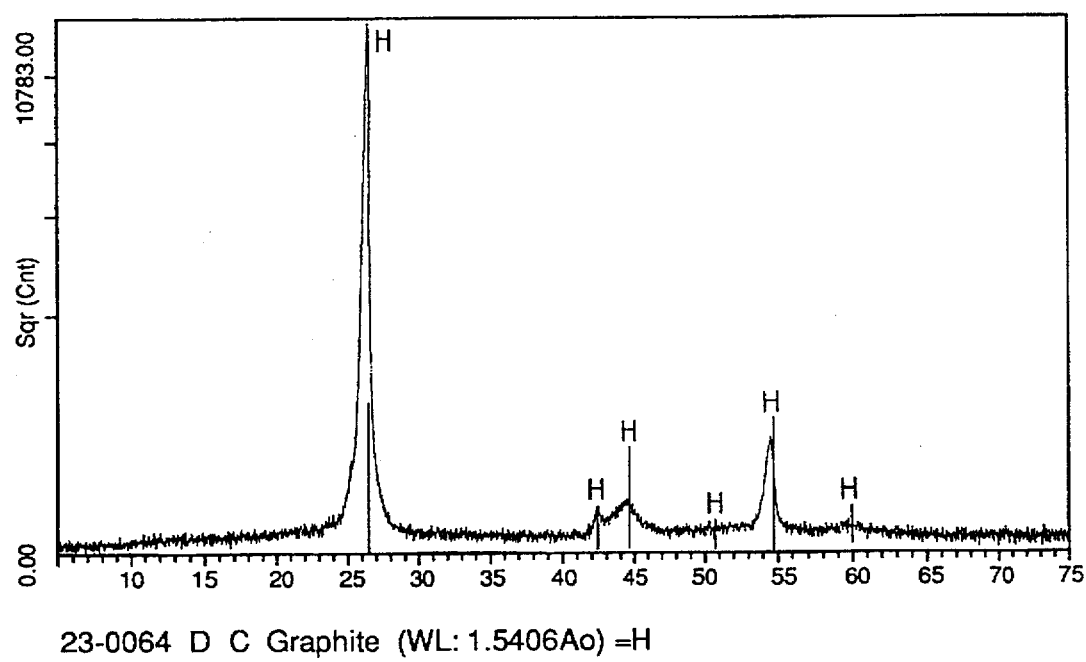

An electrographite dust which has a particle size of 0.01–0.1 mm and according to X-ray diffraction pattern consists only of hexagonal graphite (for X-ray diffraction pattern cf. FIG. 1) is mixed with 10% by weight of sucrose and fed to a roll compactor. However, a compact cannot be obtained. Although good filling of the die is achieved in the tablet press, the material disintegrates into a powder again when the die is removed.

Examples according to the invention

Example 2

Figure 2:
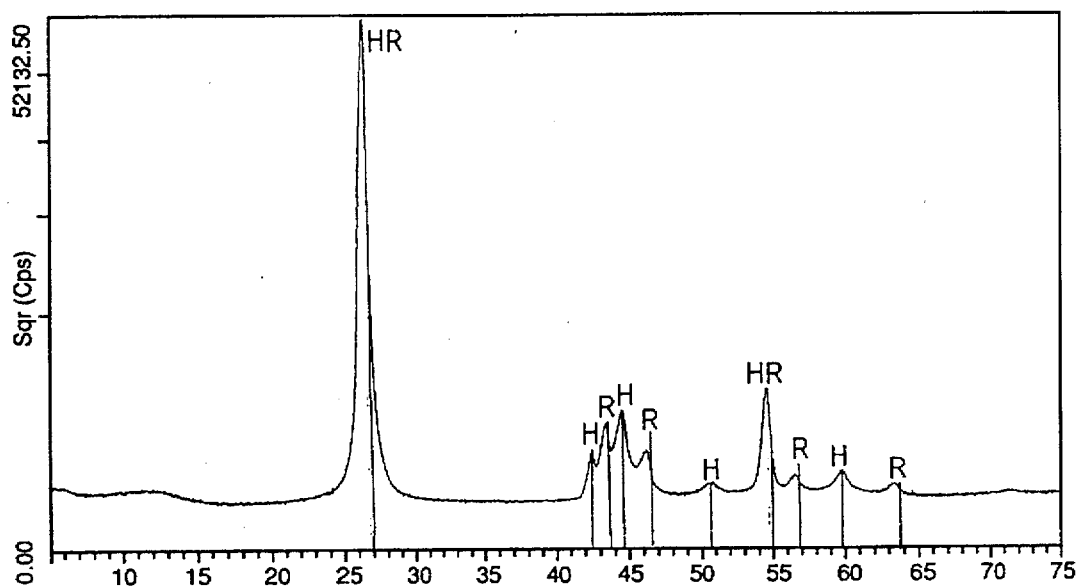

A graphite powder containing about 10% by weight of rhombohedral carbon (for X-ray diffraction pattern cf. FIG. 2) is thoroughly mixed with 10% by weight of powdered sucrose and compacted in a roll compactor. The compact is deagglomerated on a sieve disintegrator and a fine fraction of the granules which is smaller than 200 μm is removed by sieving. The granules having a density of 850 g/l are compressed on a rotary tablet press at a height of fill of 12 mm to give tablets having the dimensions 4.75×4.75 mm (diameter×height).

The crude tablets obtained have a lateral compressive strength of about 50N.

These tablets are transferred to a nitrogen-flushed rack-type oven, heated to 500° C. in the course of 3 hours and kept at this temperature for 2 hours.

The prepared graphite tablets have the following properties:

| Density | 1215 g/l |
| --- | --- |
| Lateral compressive strength | 126 N |
| Porosity | 0.10 ml/g |
| BET surface area | 5.5 m²/g |
| Thermal conductivity | 150 kcal/m*h*K |
| Electrical conductivity | $1.25 \times 10^{-3} \Omega^{-1} \cdot cm^{-1}$ |
| Pressure loss in air | 48.5 mbar/m |
| (for loose bed and gas velocity = 1.0 m/s) | |

Example 3

The procedure is as in Example 2 and the graphite granules are compressed to give annular tablets having the dimensions 5×2×5 mm (external diameter×internal diameter×height), which are heated at 500° C. in a stream of nitrogen.

The tablet properties obtained are as follows:

| Density | 937 g/l |
| --- | --- |
| Lateral compressive strength | 60 N |
| Porosity | 0.02 ml/g |
| BET surface area | 5.2 m²/g |
| Pressure loss in air | 26 mbar/m |
| (for loose bed and gas velocity = 1.0 m/s) | |

Example 4

The procedure is as in Example 2 and a mixture of 65 parts by weight of graphite powder which contains about 10% by weight of rhombohedral carbon with 35% by weight of boehmite powder and 10% by weight of sucrose is compressed to give tablets having the dimensions 4.75×4.75 mm.

After heating at 500° C. under a nitrogen atmosphere, the tablets have the following properties:

| Density | 900 g/l |
| --- | --- |
| Lateral compressive strength | 74 N |
| Porosity | 0.27 ml/g |
| BET surface area | 65 m²/g |

Example 5

The procedure is as in Example 2 and a mixture of 90 parts by weight of graphite which contains about 10% by weight of rhombohedral carbon with 10% by weight of copper powder and 10% by weight of sucrose is compressed to give tablets having the dimensions 4.75×4.75 mm. After heating at 500° C. under a nitrogen atomsphere, the tablets have the following properties:

| Density | 1190 g/l |
| --- | --- |
| Porosity | 0.12 ml/g |
| Lateral compressive strength | 164 N |
| BET surface area | 4 m²/g |

Example 6

Annular tablets produced according to Example 3 are used as diluent in the ethylene dichloride synthesis. For this purpose, the $CuCl_2/KCl/Al_2O_3$ catalyst, which is present in annular form having the dimensions 5×5×2 mm, is mixed with the 5×5×2 mm graphite rings according to the plant-specific dilution profile (high dilution at gas inlet, low dilution at gas outlet).

By using annular graphite tablets, the pressure loss in the plant can be reduced by up to 10% compared with the pressure loss with the use of cylindrical or chip-like granules.

We claim:

1. A process for the production of a graphite molding containing from 30 to 98% by weight of graphite, from 2 to 30% by weight of a binder and up to 50% by weight of other optional additives, which process comprises:

forming a graphite powder mixture with said binder, wherein said graphite powder consists essentially of from 5 to 100% by weight of a rhombohedral crystalline graphite;

compression molding said mixture at a temperature of from 10° to 100° C. and a compressive force of from 5 to 100 kN; and subjecting the initially molded product to a heat treatment in the absence of oxygen at a temperature of from 300° to 600° C.

2. A process as claimed in claim 1, wherein said heat treatment is carried out at from 400° to 600° C.

3. A process as claimed in claim 1 wherein said mixture contains from 2 up to 20% by weight of said binder.

4. A process as claimed in claim 1, wherein said binder is a carbohydrate which is cokable at said temperatures of from 300° to 600° C.

5. A process as claimed in claim 4, wherein said binder is selected from the group consisting of mono- and oligo-saccharides.

6. A process as claimed in claim 5, wherein the initially molded product is subjected to a heat treatment in the absence of oxygen at a temperature of from 400° to 600° C.

* * * * *